United States Patent
Park (10) Patent No.: US 9,574,638 B2
(45) Date of Patent: Feb. 21, 2017

(54) TRANSMISSION FOR VEHICLE (71) Applicant: Hyundai Motor Company, Seoul (KR)

(72) Inventor: Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 14/562,495

(22) Filed: Dec. 5, 2014

(65) Prior Publication Data

US 2016/0084350 A1    Mar. 24, 2016

(30) Foreign Application Priority Data

Sep. 23, 2014   (KR) .................. 10-2014-0126525

(51) Int. Cl.
| | | |
|---|---|---|
| F16H 3/08 | (2006.01) | |
| F16H 3/089 | (2006.01) | |
| F16H 61/04 | (2006.01) | |
| F16H 3/093 | (2006.01) | |

(52) U.S. Cl.
CPC ............. *F16H 3/089* (2013.01); *F16H 3/093* (2013.01); *F16H 61/0403* (2013.01); *F16H 2003/0818* (2013.01); *F16H 2061/0407* (2013.01); *F16H 2061/0418* (2013.01); *F16H 2200/0021* (2013.01); *F16H 2200/0034* (2013.01)

(58) Field of Classification Search
CPC .. F16H 3/006; F16H 2003/0931; F16H 3/091; F16H 47/02
USPC .................................................... 74/325, 339
See application file for complete search history.

(56) References Cited

U.S. PATENT DOCUMENTS

| | | | | |
|---|---|---|---|---|
| 5,951,436 A | * | 9/1999 | Kim | B60L 15/2054 477/20 |
| 6,244,123 B1 | * | 6/2001 | Hegerath | F16H 3/093 74/325 |
| 6,328,670 B1 | * | 12/2001 | Minowa | B60K 6/547 180/65.21 |
| 6,341,541 B1 | * | 1/2002 | Sakamoto | B60K 6/36 74/665 A |
| 6,502,474 B2 | * | 1/2003 | Sakamoto | B60K 6/48 477/181 |
| 6,679,133 B1 | * | 1/2004 | Kayano | F16H 3/12 477/906 |
| 8,437,931 B2 | * | 5/2013 | Asplund | F16H 61/2807 192/3.55 |
| 8,986,151 B2 | * | 3/2015 | Valente | B60K 17/346 180/233 |

(Continued)

FOREIGN PATENT DOCUMENTS

| | | |
|---|---|---|
| JP | 2002-21997 A | 1/2002 |
| JP | 2009-121591 A | 6/2009 |

(Continued)

*Primary Examiner* — Ha D Ho
(74) *Attorney, Agent, or Firm* — Morgan, Lewis & Bockius LLP (57) ABSTRACT

A transmission for a vehicle may include an input shaft connected to a power source, an output shaft disposed in parallel with the input shaft, a synchromesh type shift mechanism including at least two pairs of external gear pairs and a synchronous device which may be installed on the input shaft and the output shaft, and a clutch device provided on a power transfer path connected from the input shaft to the output shaft through the external gear pair and configured to connect the synchronous device in parallel with the power transfer path.

2 Claims, 6 Drawing Sheets (56) References Cited

U.S. PATENT DOCUMENTS

| | | |
|---|---|---|
| 2011/0079097 A1 | 4/2011 | Cavallino |
| 2012/0100957 A1 | 4/2012 | Reitz |
| 2012/0238394 A1* | 9/2012 | Valente ................ B60K 17/346 |
| | | 475/221 |

FOREIGN PATENT DOCUMENTS

| | | |
|---|---|---|
| JP | 2011-208681 A | 10/2011 |
| JP | 2012-117602 A | 6/2012 |
| JP | 2013-024391 A | 2/2013 |
| KR | 10-2011-0060523 A | 6/2011 |

* cited by examiner

TRANSMISSION FOR VEHICLE

CROSS REFERENCE TO RELATED APPLICATION

The present application claims priority of Korean Patent Application Number 10-2014-0126525 filed on Sep. 23, 2014, the entire contents of which application are incorporated herein for all purposes by this reference.

BACKGROUND OF THE INVENTION

Field of the Invention

The present invention relates to a transmission for a vehicle, and more particularly, to a structure of a transmission which may be used for an electric vehicle, or the like.

Description of Related Art

Since an electric vehicle according to the related art typically includes only a simple decelerator, it has a configuration which simply decelerates power generated from a motor and provides it to a driving wheel. However, in order to recently satisfy a wide range of usage demand of the electric vehicle, it is requested to provide more improved power performance.

In order to improve the power performance of the electric vehicle, it has been attempted to mount a transmission capable of providing at least two shift ratio instead of the simple decelerator. For a simple configuration and high power transfer efficiency, synchromesh type shift mechanism which is mainly used for a manual transmission vehicle according to the related art has been considered.

However, since the synchromesh type shift mechanism necessarily involves a torque interruption process in which the power transferred to the driving wheel is interrupted during a process of releasing a previous shift stage and performing a shift to the next shift stage when performing the shift, thereby causing a shift shock.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle capable of forming soft shift quality since torque interruption does not occur when performing a shift while using synchromesh type shift mechanism having a simple configuration and high power transfer efficiency, increasing the highest velocity, acceleration performance, and hill-climbing ability of an electric vehicle as compared to a decelerator according to the related art upon being mounted in the electric vehicle, and improving fuel efficiency by expanding an operation time of an optimal efficiency driving point of a motor.

According to an aspect of the present invention, there is provided a transmission for a vehicle including an input shaft IN connected to a power source, an output shaft disposed in parallel with the input shaft, a synchromesh type shift mechanism including at least two pairs of external gear pairs and a synchronous device which are installed on the input shaft and the output shaft, and a clutch means provided on a power transfer path connected from the input shaft IN to the output shaft through the external gear pair and configured to connect the synchronous device in parallel with the power transfer path.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
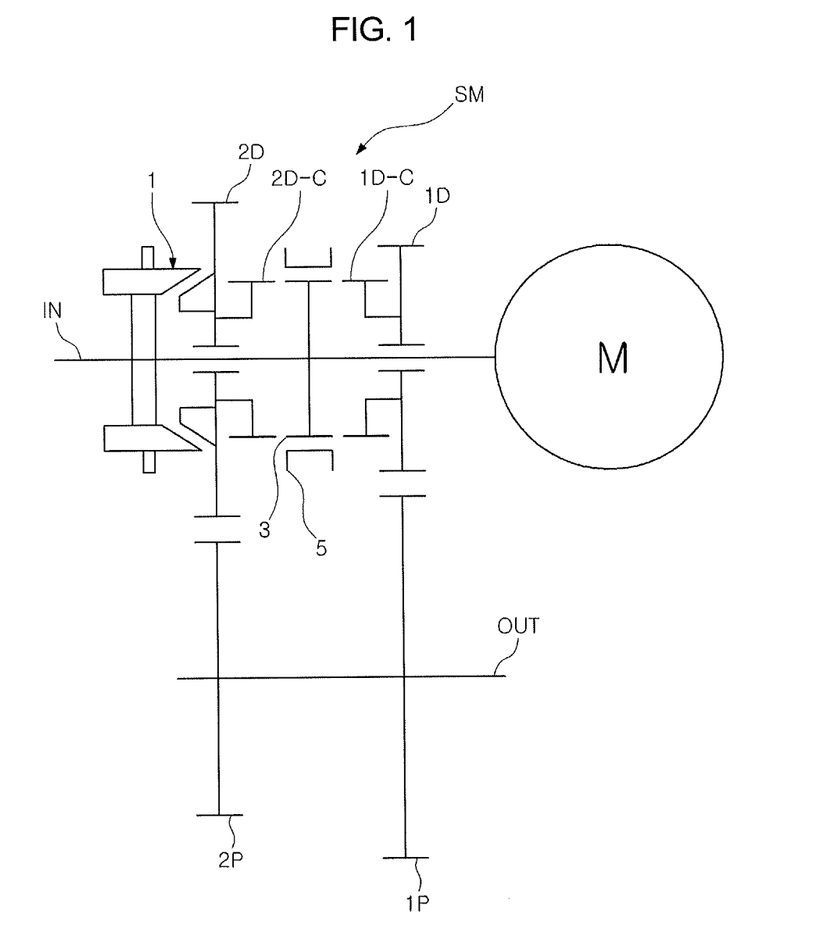
FIG. 1 is a configuration diagram of a transmission for a vehicle according to an exemplary embodiment of the present invention.

Referring to FIG. 1, a transmission for a vehicle according to an exemplary embodiment of the present invention is configured to include an input shaft IN connected to a power source, an output shaft OUT disposed in parallel with the input shaft IN, a synchromesh type shift mechanism SM including at least two pairs of external gear pairs and a synchronous device which are installed on the input shaft IN and the output shaft OUT, and a clutch means provided on a power transfer path connected from the input shaft IN to the output shaft OUT through the external gear pair and configured to connect the synchronous device in parallel with the power transfer path.

That is, the transmission for the vehicle according to the exemplary embodiment of the present invention is based on a general synchromesh type shift mechanism according to the related art, but further includes the clutch means capable of switching a transfer and interruption of power in addition to the synchronous device serving to switch the transfer and interruption of power in the synchromesh type shift mechanism, such that the clutch means may maintain power in a connected state while the synchronous device interrupts power for performing the shift, thereby making it possible to prevent a conventional torque interruption phenomenon.

As the above-mentioned power source, a motor M connected to the input shaft IN is configured, and the clutch means includes a conical clutch 1.

According to the present exemplary embodiment, the at least two pairs of external gear pairs include one-level external gear pair forming the largest shift ratio, and a two-level external gear pair forming a shift ratio which is smaller than that of one-level external gear pair. Of course, in addition to the above-mentioned configuration, an external gear pair forming a higher shift stage by a smaller shift ratio may be further provided.

One-level external gear pair includes one-level driving gear 1D installed in the input shaft IN in a state in which a rotation thereof is free and one-level driven gear 1P installed in the output shaft OUT in a state in which a rotation thereof is constrained, and the two-level external gear pair includes a two-level driving gear 2D installed in the input shaft IN in a state in which a rotation thereof is free and a two-level driven gear 2P installed in the output shaft OUT in a state in which a rotation thereof is constrained.

By the above-mentioned configuration, the clutch means includes the conical clutch 1 configured to connect between the two-level driving gear 2D and the input shaft IN in a power transferable state or a power interrupting state.

The conical clutch 1 is provided to a direction opposite to direction in which the synchronous device is provided, based on the two-level driving gear 2D.

The synchronous device includes a hub 3 installed in the input shaft IN so that a rotation is restricted, a sleeve 5 which is spline-coupled to be slidable in a shaft direction for the hub 3. and a clutch gear 2D-C formed in the two-level driving gear 2D so as to be coupled to the sleeve 5, and also includes a synchronizer ring, or the like performing a substantial synchronous operation. Since the above-mentioned configuration is the same as the known configuration according to the related art, it is not specifically shown.

In addition, one-level driving gear 1D is also provided with a clutch gear 1D-C engaged with the sleeve 5, such that the synchronous device may form one-level shift stage by connecting one-level driving gear 1D to the input shaft IN in a state in which the sleeve 5 is moved to right on the drawing and may form a two-level shift stage by connecting the two-level driving gear 2D to the input shaft IN in a state in which the sleeve 5 is moved to left.

Therefore, the two-level driving gear 2D has a conical surface configuring the conical clutch 1 on an opposite surface of a surface on which the clutch gear 2D-C is formed.

The reason for using the above-mentioned conical clutch 1 without using a dry clutch or a wet clutch of a general disc type as the clutch means is that the conical clutch has the largest torque transfer capacity in the case in which a volume occupied by the clutch is constant.

A shift process of the transmission according to an exemplary embodiment of the present invention having the above-mentioned configuration will be described with reference to FIGS. 2 to 6.

Figure 2:
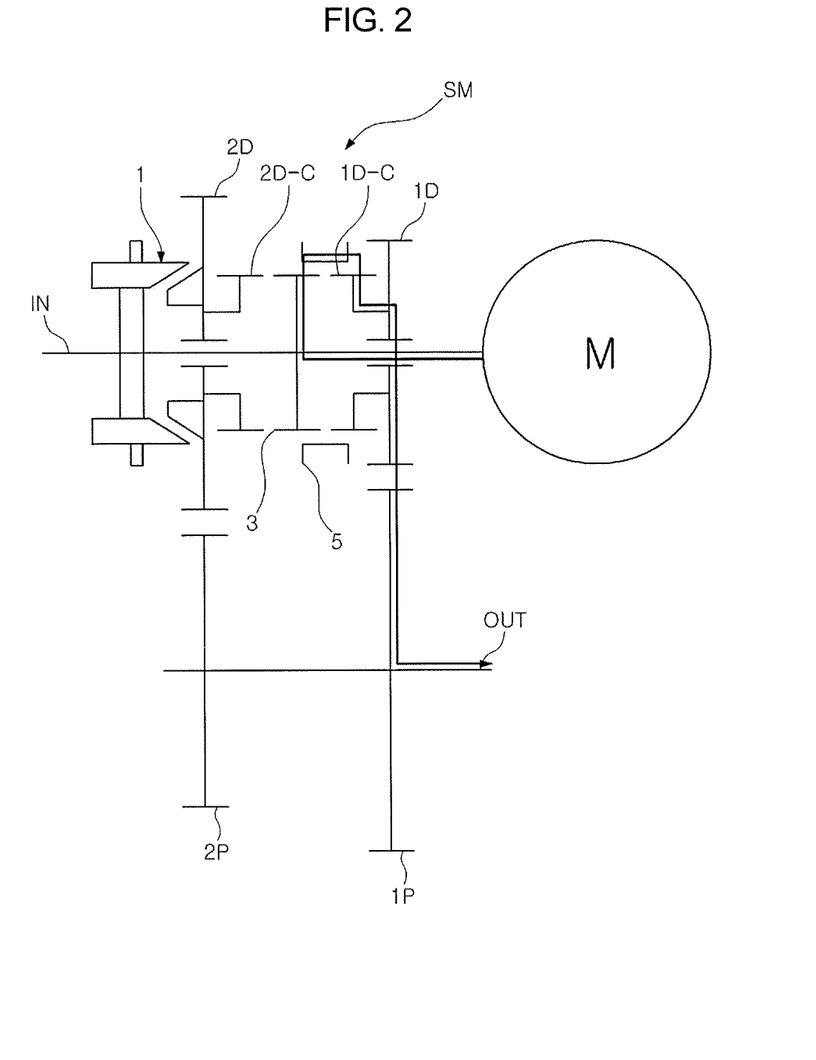
FIG. 2, FIG. 3, FIG. 4, FIG. 5 and FIG. 6 are diagrams sequentially showing processes in which the transmission of FIG. 1 performs a shift from a one-level driving state to a two-level driving state.

FIG. 2 shows one-level driving state which is a state in which one-level driving gear 1D is connected to the input shaft IN such that the sleeve 5 of the synchronous device is moved to the right and is coupled to the clutch gear 1D-C of one-level driving gear 1D. In this state, the power generated from the motor M is sequentially transferred to one-level driving gear 1D and one-level driven gear 1P through the hub 3 and the sleeve 5 of the synchronous device from the input shaft IN and the shift is performed, such that an output of one-level shift stage is drawn to the output shaft OUT.

Figure 3:
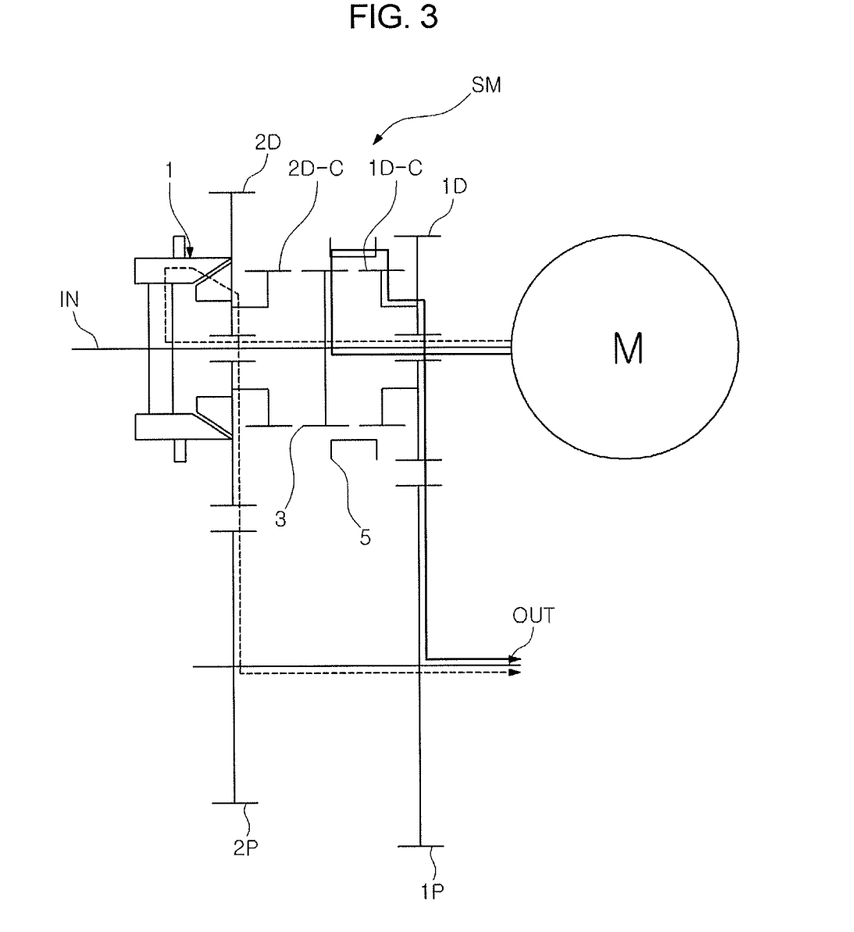

In the case in which a shift to the two-level is required, as shown in FIG. 3, the synchronous device maintains the same state as that of FIG. 2 to maintain one-level driving state as it is, and causes friction of the conical clutch 1 which is the clutch means, thereby allowing the power of the input shaft IN to be transferred to the output shaft OUT even through the two-level driving gear 2D and the two-level driven gear 2P.

In this case, a velocity difference due to one-level shift ratio between one-level driving gear 1D and one-level driven gear 1P, and the two-level shift ratio between the two-level driving gear 2D and the two-level driven gear 2P is absorbed by a sleeve in the conical clutch 1.

Figure 4:
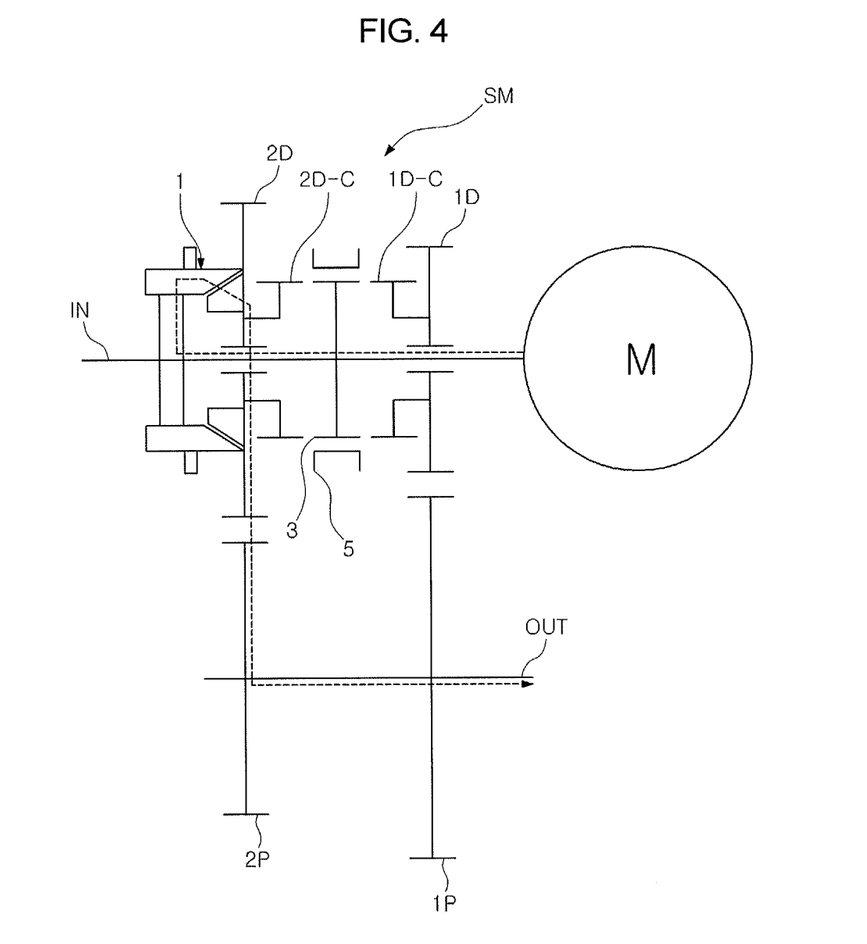

A state shown in FIG. 4 is a state in which the sleeve 5 is moved to a neutral state from the state of FIG. 3 to interrupt one-level driving gear 1D from the input shaft IN, and the power is no longer transferred to the output shaft OUT through one-level driving gear 1D and one-level driven gear 1P and is transferred to the output shaft OUT only through the conical clutch 1, the two-level driving gear 2D, and the two-level driven gear 2P.

In this state, by controlling a velocity of the motor M, a velocity of the sleeve 5 of the synchronous device is synchronized with a velocity of the two-level driving gear 2D.

Figure 5:
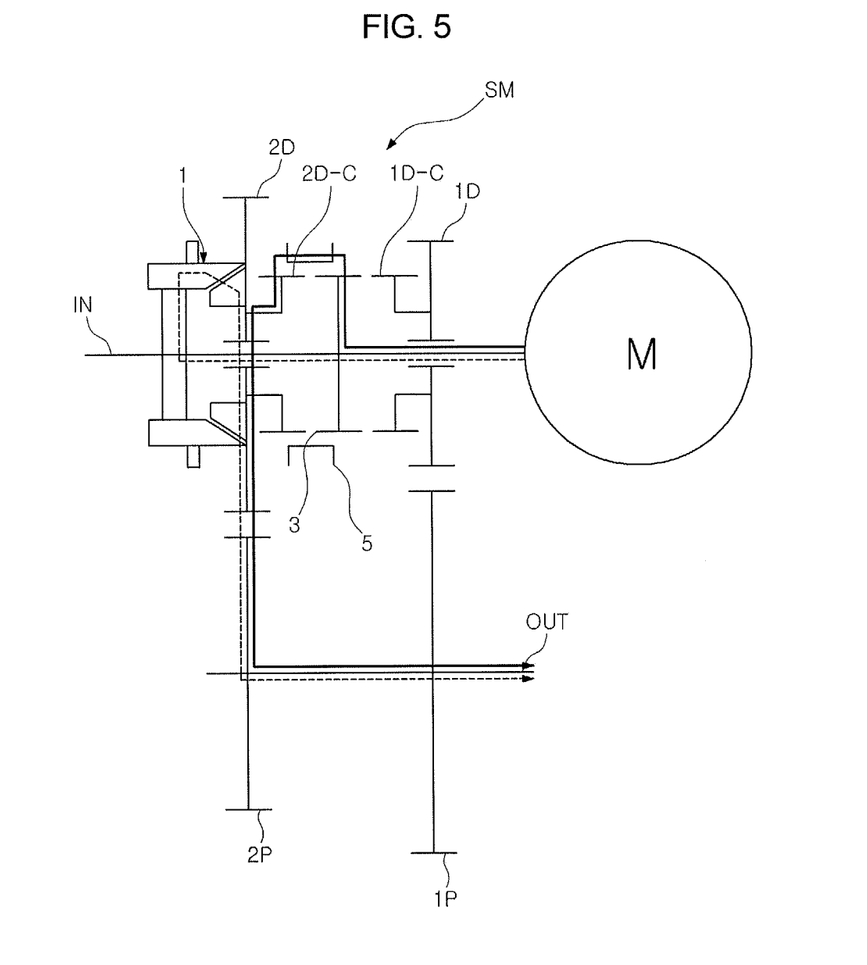
Figure 6:
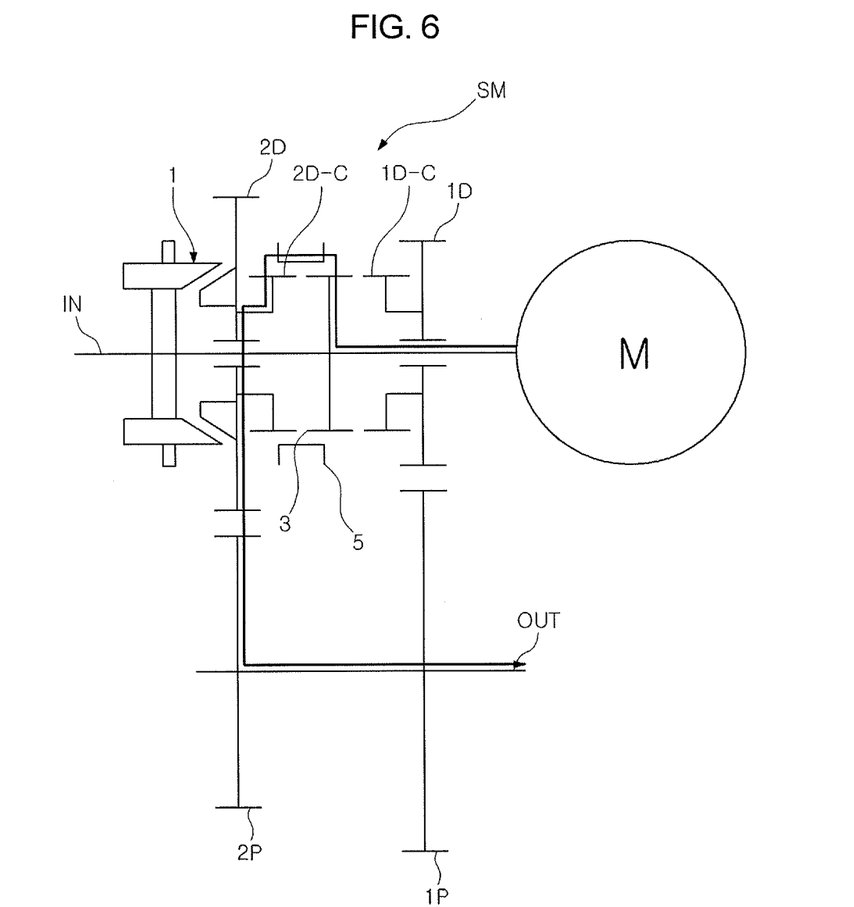

If the velocity of the sleeve 5 of the synchronous device is synchronized with the velocity of the two-level driving gear 2D as described above, the sleeve 5 is moved to the left as shown in FIG. 5 to connect the two-level driving gear 2D to the input shaft IN and the conical clutch 1 is released as shown in FIG. 6 to form the two-level driving state.

That is, the conical clutch 1 transfers the power of the input shaft IN to the output shaft OUT during a time after the sleeve 5 of the synchronous device is separated from the clutch gear 1D-C of one-level driving gear 1D until it is coupled to the clutch gear 2D-C of the two-level driving gear 2D, thereby preventing an occurrence of torque interruption during the shift.

Since the above-mentioned configuration may be very simple and may be simply applied to the synchromesh type shift mechanism according to the related art, and the conical clutch 1 only consumes energy which is necessary for an operation while being operated to momentarily transfer the power only when performing the shift and is in a released state for the most vehicle driving time, unnecessary power consumption may be minimized, thereby making it possible to improve fuel efficiency of the vehicle.

According to the exemplary embodiment of the present invention, soft shift quality may be formed since torque interruption does not occur when performing a shift while using synchromesh type shift mechanism having a simple configuration and high power transfer efficiency, the highest velocity, acceleration performance, and hill-climbing ability of an electric vehicle may be increased as compared to a decelerator according to the related art upon being mounted in the electric vehicle, and fuel efficiency may be improved by expanding an operation time of an optimal efficiency driving point of a motor.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, the transmission comprising:
    an input shaft connected to a power source;
    an output shaft disposed in parallel with the input shaft;
    a synchromesh shift mechanism including at least two pairs of external gear pairs and a synchronous device mounted on the input shaft and the output shaft; and
    a clutch device provided on a power transfer path connected from the input shaft to the output shaft through at least one of the external gear pairs and configured to connect the synchronous device in parallel with the power transfer path,
    wherein the clutch device includes a conical clutch and is selectively and directly engaged to the at least one of the external gear pairs,
    wherein the at least two pairs of external gear pairs include one-level external gear pair forming a largest shift ratio, and a two-level external gear pair forming a shift ratio smaller than that of one-level external gear pair,
    wherein one-level external gear pair includes one-level driving gear installed in the input shaft in a state to be freely rotated, and one-level driven gear installed in the output shaft in a state to be restrictively rotated,
    wherein the two-level external gear pair includes a two-level driving gear installed in the input shaft in a state to be freely rotated, and a two-level driven gear installed in the output shaft in a state to be restrictively rotated, and
    wherein the clutch device includes the conical clutch configured to connect between the two-level driving gear and the input shaft in a power transferable state or a power interrupting state.

2. The transmission of claim 1, wherein the conical clutch is provided to a direction opposite to a direction in which the synchronous device is provided, based on the two-level driving gear.

* * * * *